(12) United States Patent  (10) Patent No.: US 7,545,591 B1
Tong et al.  (45) Date of Patent: Jun. 9, 2009

(54) UNIFORM WALL THICKNESS LENS BARREL

(75) Inventors: Davy Tong, Temple City, CA (US); Robert J. Calvet, Pasadena, CA (US)

(73) Assignee: Siimpel Corporation, Arcadia, CA (US)

( * ) Notice: Subject to any disclaimer, the term of this patent is extended or adjusted under 35 U.S.C. 154(b) by 7 days.

(21) Appl. No.: 11/550,305

(22) Filed: Oct. 17, 2006

(51) Int. Cl.
*G02B 7/02* (2006.01)
(52) U.S. Cl. ..................................... 359/827
(58) Field of Classification Search ................ 359/811, 359/813, 819, 827, 829
See application file for complete search history.

(56) References Cited

U.S. PATENT DOCUMENTS

2005/0168846 A1* 8/2005 Ye et al. ..................... 359/819
2007/0014566 A1* 1/2007 Sobajima et al. ............ 396/330
2007/0045550 A1* 3/2007 Nakajo et al. .......... 250/370.08
2007/0063136 A1* 3/2007 Chiang ....................... 250/239
2007/0223110 A1* 9/2007 Ge et al. ..................... 359/699

FOREIGN PATENT DOCUMENTS

JP  2003-407634  *  6/2005

* cited by examiner

*Primary Examiner*—Jessica T Stultz
*Assistant Examiner*—Mahidere S Sahle
(74) *Attorney, Agent, or Firm*—Haynes and Boone, LLP

(57) ABSTRACT

Systems and techniques for improved lens barrel tolerance in optical systems. In some embodiments, a lens barrel has a first end section configured to position a first lens with a first diameter and a second section configured to position a second lens with a second larger diameter. The first end section of the lens barrel may include an inner mating section configured to position the first lens and an outer thread section. One of more portions of the inner mating section and associated portions of the outer thread section may be separated by a gap.

14 Claims, 4 Drawing Sheets

Section A-A

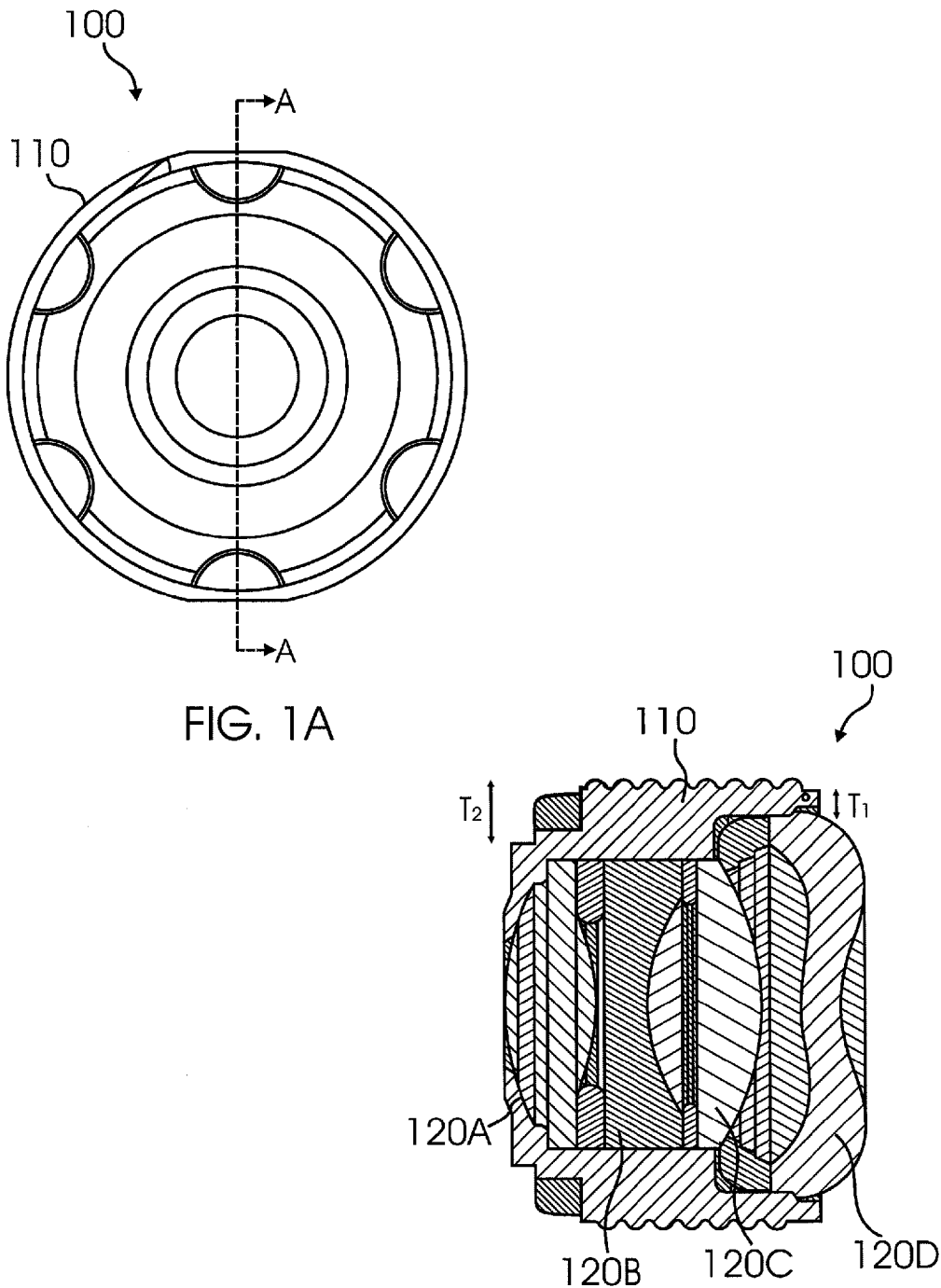

Section A-A

UNIFORM WALL THICKNESS LENS BARREL

TECHNICAL FIELD

This invention generally relates to miniature cameras.

BACKGROUND

Miniature cameras are currently available with many electronic devices, such as cellular telephones, laptop computers, personal digital assistants (PDAs), and the like. Miniature cameras are also available as stand-alone devices for applications such as security and surveillance The market for miniature cameras is rapidly expanding. For example, camera-equipped cell phones were unheard of just a few years ago; now, they are a significant portion of the cell phone market. However, available miniature cameras may not be optimal for some applications.

For example, available miniature cameras may not be optimal because they are fixed focus cameras (i.e., the focus of the cameras is pre-set). By using a relatively small aperture, the depth of field is sufficient to provide acceptable focus over a wide range of distances. However, the provided focus may be unacceptable for some applications. Additionally, the relatively small aperture limits the light used to form the image. This limitation may severely limit the camera's use in low light conditions.

Miniature cameras generally include a number of different lenses that are positioned in a lens barrel. The lens barrel may be mounted in the miniature camera using external threads in the lens barrel.

SUMMARY

Miniature devices including optical systems may have enhanced optical properties by incorporating a lens barrel with improved tolerance of an outer surface of the lens barrel.

In general, in one aspect, a lens barrel comprises first end section configured to position a first lens with a first diameter, the first end section proximate a first end of the lens barrel, and a second section configured to position a second lens with a second larger diameter. The first end section may include an inner mating section configured to position the first lens and an outer thread section. One or more portions of the inner mating section and associated portions of the outer thread section may be separated by a gap. The second section may be a second end section proximate a second end of the lens barrel opposite the first end.

The lens barrel may include a plurality of cavities in a forward surface of the lens barrel. Each of the plurality of cavities may form the gap between one of the one or more portions of the inner mating section and the associated portion of the outer thread section. The gap may include a first portion with a first gap size and a second portion with a second gap size.

In general, in another aspect, an optical system may comprise a first lens having a first diameter, a second lens having a second diameter greater than the first diameter, and a lens barrel. The lens barrel may have an outer surface including a threaded portion, a first inner mating region positioning the first lens within the lens barrel, and a second inner mating region positioning the second lens within the lens barrel. A wall thickness of an outer wall section of the lens barrel along the threaded portion of the outer surface may be substantially constant. The lens barrel may include a plurality of cavities in a forward surface of the lens barrel. Each of the plurality of cavities may form a gap between a portion of the lens barrel proximate the first mating surface and an associated portion of the lens barrel proximate the threaded portion of the outer surface.

The lens barrel may further include a third mating surface positioning a third lens, and may include a gap between a portion of the lens barrel proximate the third mating surface and an associated portion of the lens barrel proximate to the threaded portion of the outer surface. The lens barrel may comprise one or more injection molded parts.

A wall thickness of an inner wall section of the lens barrel along the first inner mating region and second inner mating region may be substantially constant, and the outer wall section of the lens barrel and the inner wall section may be separated by a gap.

In general, in another aspect, a mobile electronic device comprises a housing, a lens barrel mounted to the housing, and a plurality of lenses mounted in the lens barrel. The plurality of lenses includes a first lens with a first diameter and a second lens with a second greater diameter. The lens barrel may comprise a first end section positioning the first lens, the first end section proximate a first end of the lens barrel, and a second section positioning the second lens. The first end section may include an inner mating section positioning the first lens and an outer thread section. One or more portions of the inner mating section and associated portions of the outer thread section may be separated by a gap.

The housing may comprise a threaded portion sized and configured to receive the outer thread section of the lens barrel. The first end section may be positioned proximate a light receiving end of the device. The second section may be positioned proximate a detector. The device may be configured to implement at least one of zoom, autofocus, and image stabilization. The device may comprise a miniature camera, and may further comprise at least one device type from the group consisting of a mobile security device, a cell phone, a mobile computing device, and a personal digital assistant.

These and other features and advantages of the present invention will be more readily apparent from the detailed description of the exemplary implementations set forth below taken in conjunction with the accompanying drawings.

BRIEF DESCRIPTION OF THE DRAWINGS

FIGS. 1A to 1C are front, side, and perspective views of a lens barrel to position lenses in an optical system;

FIGS. 2A to 2C are front, side, and perspective views of a lens barrel to position lenses in an optical system, according to some embodiments;

Like reference symbols in the various drawings indicate like elements.

DETAILED DESCRIPTION systems and techniques herein provide for enhanced optical properties of miniature cameras through improved lens barrel tolerances.

As noted above, a lens barrel may be used to position multiple lenses for a miniature camera or other optical system. In many cases, different lenses have different diameters. In previous lens barrels, the wall thickness of the lens barrel varied to accommodate the different lens diameters.

Figures 1C, 2C:
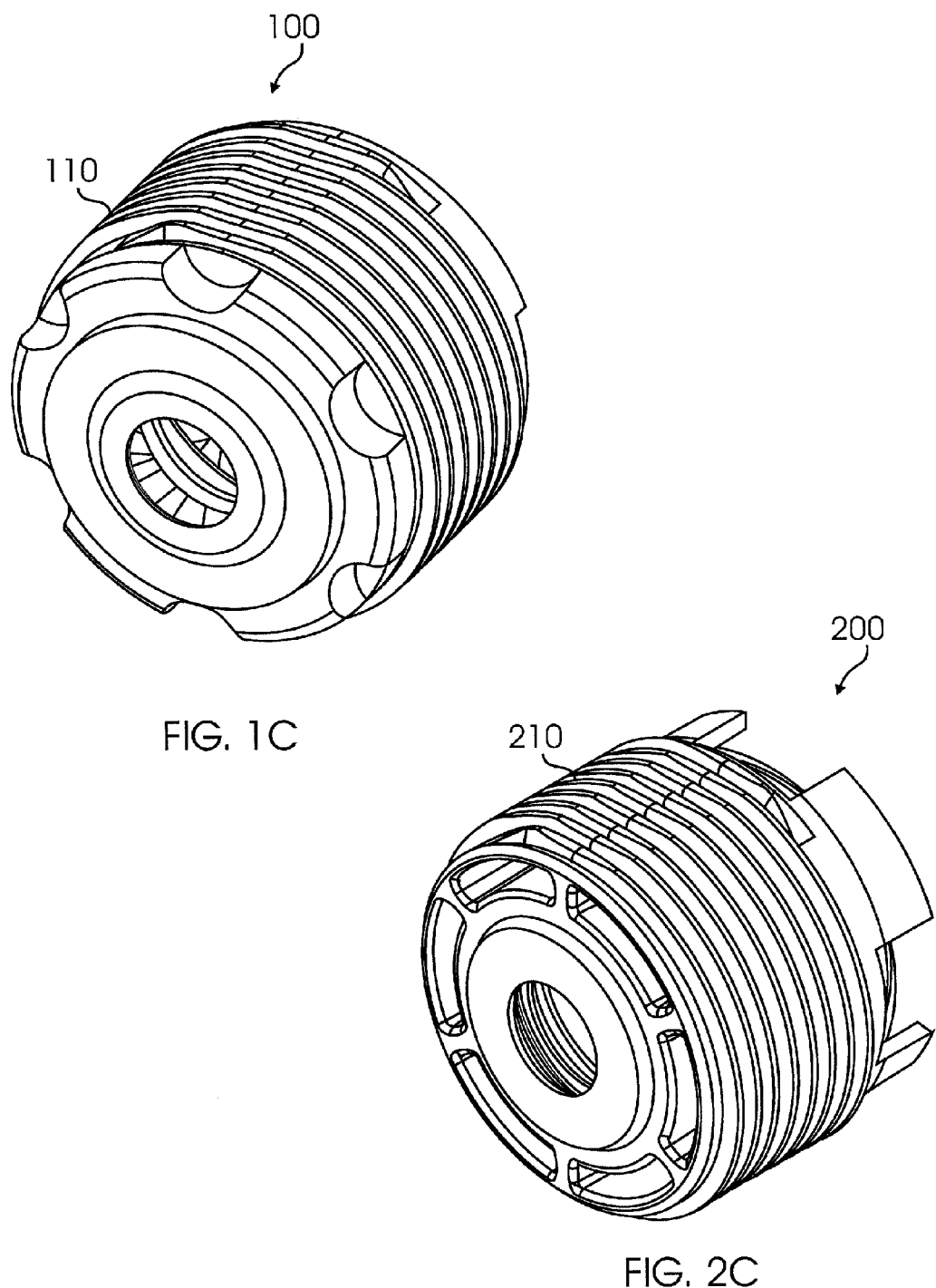

FIGS. 1A to 1C show front, side, and perspective views of an example of a lens system 100 including a lens barrel 110 and a plurality of lenses 120A to 120D positioned in lens barrel 110. The lens diameter differs among lenses 120A to 120D, with lens 120D (which is generally positioned proximate a detector system in a miniature camera) having the greatest diameter. In order to accommodate this difference, the wall thickness of lens barrel 110 changes along the length of lens barrel 110. In the illustrated example, the thickness $T_1$ proximate lens 120D is less than half the thickness $T_2$ proximate lens 120B.

This approach to lens barrel design for multi-diameter lens groups has the advantage of simplicity. However, deformation of the outer threads (referred to as "sink") can occur due to the varying wall thickness of the plastic used to form the lens barrel. Thread deformation may make it difficult or impossible to align the optical components to obtain the desired optical quality.

Rather than allowing the wall thickness of the lens barrel to vary as the outer diameter of the lenses varies, some embodiments of the current invention provide for a lens barrel in which the wall thickness is substantially constant at least along a region of the lens barrel proximate the external threads.

Figure 2A:
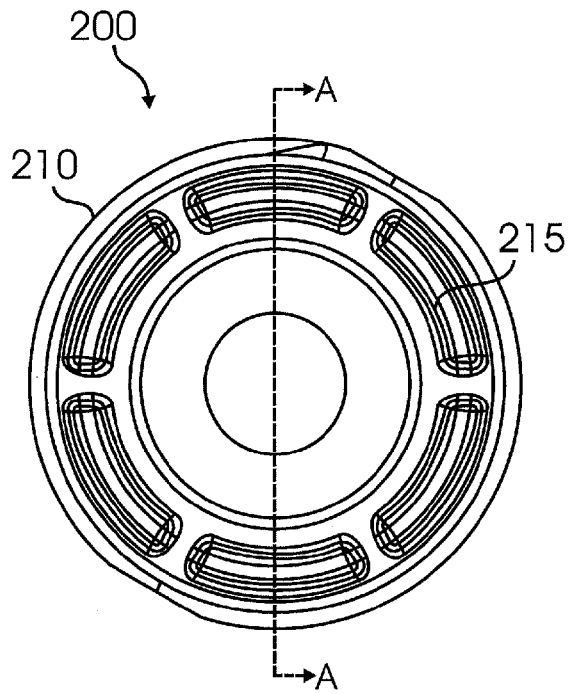
Figure 2B:
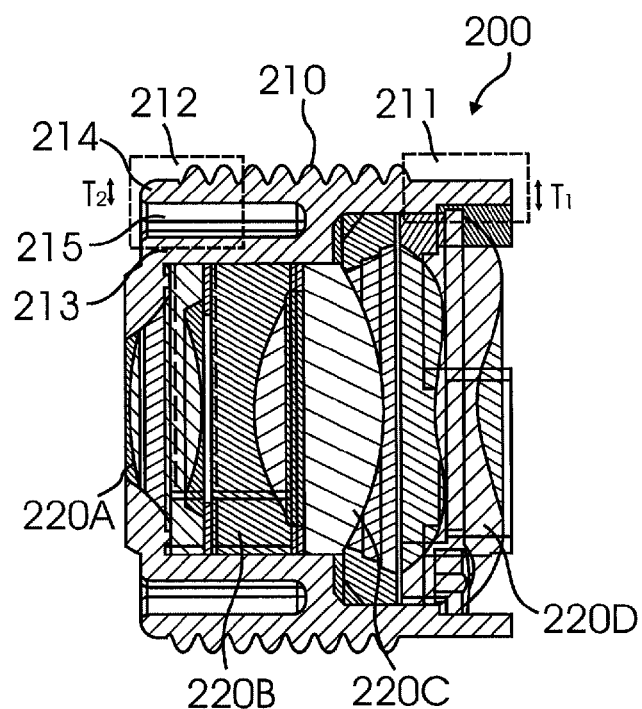

FIGS. 2A to 2C show front, side, and perspective views of an example of a lens system 200, according to some embodiments. Lens system 200 includes a lens barrel 210 and lenses 220A to 220D. Note that the phrase "lens barrel" as used herein denotes a positioner configured to hold one or more lenses and does not imply any particular shape or construction.

Lens barrel 210 positions lenses 220A to 220D along an axis through the center of lens barrel 210. As in the example of FIGS. 1A to 1C, lens 220D has the greatest diameter of the lenses positioned by lens barrel 210.

The wall thickness of lens barrel 210 proximate to the external threads is substantially the same at each end of the external threads. Note that the wall thickness does not include the threaded portions themselves. That is, the wall thickness $T_1$ proximate lens 220D (at the detector end of lens system 200) is substantially the same as the thickness $T_2$ proximate lens 220A.

In order to provide a substantially similar wall thickness at least along the exterior threaded portion of lens barrel 210, a gap 215 is provided at an end portion 212 between an inner mating section 213 configured to position one or more of the lenses 220A to 220D and an outer thread portion 214 including one or more threads.

In the embodiment of FIGS. 2A to 2C, the gap is not continuous around the diameter of lens barrel 210. Instead, multiple cavities are formed in a forward surface of lens barrel 210. As a result, there is a gap 215 between some portions of inner mating section 213 and associated portions of outer thread portion 214, while other portions have continuous material between the surface that mates with the outer diameter of one or more of the lenses 220A to 220D and the threaded surface. Note that although the gap is illustrated as having a constant gap size, in some embodiments the gap size may vary along its extent (either continuously or in steps). For example, if a first lens has a diameter $D_1$, a second lens has a diameter $D_2>D_1$, and a third lens has a diameter $D_3>D_2>D_1$, a first gap size $G_1$ may be used proximate the first lens, a second gap size $G_2<G_1$ may be used proximate the second lens, and no gap (or a gap smaller than $G_2$) may be used proximate the third lens.

In some embodiments, the wall thickness of inner mating section 213 proximate at least two lenses of different diameters may be substantially constant as well. In the example of FIGS. 2A to 2C, the portion of inner mating section 213 that is proximate lenses 220A and 220B has a substantially constant wall thickness. The wall thickness of inner mating section 213 and the wall thickness of outer thread portion 214 may be substantially the same, or may be different.

The amount by which the wall thickness of outer thread portion 214 may deviate depends on the shrink rate of the material. If the material has a very low shrink rate, higher amounts of deviation from strictly constant wall thickness may provide sufficient outer lens barrel diameter tolerances. For a high shrink rate, less deviation would be needed to meet tolerance specifications. In some embodiments, the wall thickness may deviate about 20% across outer thread portion 214.

A lens barrel such as lens barrel 210 can reduce or eliminate sink from the outer threads. Systems and techniques described herein thus provide an outer lens barrel diameter with tighter tolerances (i.e., less deviation), while still accommodating multi-lens lens groups incorporating lenses of different diameters. As a result of the tighter tolerances, the concentricity alignment of the optical axis can be substantially improved. By tightening the tolerances on optical alignment, the image quality can be improved without significant additional cost. Lens barrel 210 can be manufactured using relatively inexpensive plastic fabrication techniques, such as injection molding. Lens barrel 210 may be a single integrated piece or may comprise two or more pieces.

The position, shape, and relative size of lenses 210A to 210D is one example of a lens system 200 that may be used for miniature camera applications. Other embodiments may be used. For example, the lens with the largest diameter need not be positioned as the first or last lens in the assembly, but may instead be between two other lenses in the system.

Figure 3:
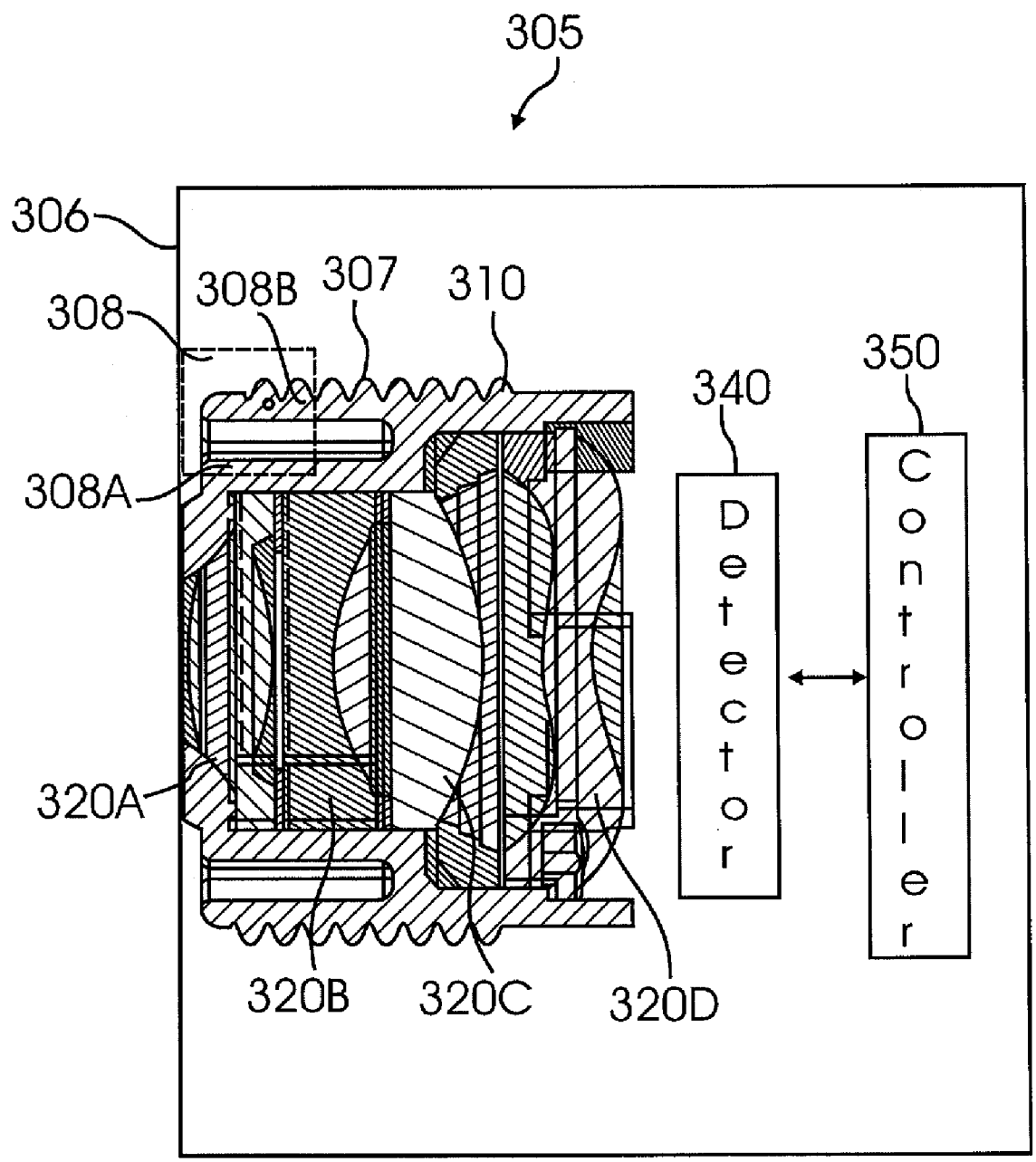
FIG. 3 is a schematic diagram of a mobile device including a lens barrel such as the lens barrel shown in FIGS. 2A to 2C.

A lens system such as system 200 of FIGS. 2A to 2C may be included in an electronic device such as device 305 of FIG. 3. Device 305 may comprise a miniature camera, and may provide further functionality (e.g., it may be a miniature camera included as part of a device that provides multiple functions such as a cell phone). Device 305 includes a plurality of lenses, such as lenses 320A to 320D, where at least some of the lenses are mounted in a lens barrel such as lens barrel 310.

Device 305 includes a housing 306 with threads 307 configured to receive threads of an outer threaded portion of lens barrel 310. A first end section 308 has an inner mating section 308A positioning lenses 320A and 320B, and an outer thread section 308B. Inner mating section 308A and outer thread section 308B are separated by a gap. The gap may be formed by a plurality of cavities in a forward surface of lens barrel 310 (e.g., a surface at the light receiving end of lens barrel 310 or detector end of lens barrel 310).

Miniature camera systems may be used in fixed or mobile devices, which may have only camera functionality or may be multi-function devices.

For example, miniature cameras may be provided as part of fixed security systems (e.g., mounted to a structure in a fixed position). Alternately, miniature cameras may be integrated with mobile devices, such as mobile security systems (e.g., a camera in a common household item not mounted in a fixed position). Other well-known examples of mobile devices include cell phones, laptop computers, and personal digital assistants (PDAs).

In the implementation of FIG. 3, device 305 includes a miniature camera that may be configured for advanced functionality such as auto-focus, image stabilization, zoom, shuttering, or the like. In some embodiments, device 305 may include a fixed focus miniature camera.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the word "means" are intended to be interpreted under 35 USC 112, sixth paragraph. In the claims, the word "a" or "an" embraces configurations with one or more element, while the phrase "a single" embraces configurations with only one element, notwithstanding the use of phrases such as "at least one of" elsewhere in the claims. Moreover, no limitations from the specification are intended to be read into any claims, unless those limitations are expressly included in the claims. Accordingly, other embodiments are within the scope of the following claims.

What is claimed is:

1. A lens barrel comprising:
   a first end section configured to position a first lens with a first diameter, the first end section proximate a first end of the lens barrel;
   a second section configured to position a second lens with a second larger diameter;
   wherein the first end section includes an inner mating section configured to position the first lens and includes an outer thread section, the outer thread section having threads formed thereon, and wherein one or more portions of the inner mating section and associated portions of the outer thread section are separated by a gap; and
   wherein the inner mating section and the outer thread section of first end section are integrally formed with the second section.

2. The lens barrel of claim 1, wherein the second section is a second end section proximate a second end of the lens barrel opposite the first end.

3. The lens barrel of claim 1, further including a plurality of cavities in a forward surface of the lens barrel, and wherein each of the plurality of cavities forms the gap between one of the one or more portions of the inner mating section and the associated portion of the outer thread section.

4. The lens barrel of claim 1, wherein the gap includes a first portion with a first gap size and a second portion with a second gap size.

5. A mobile electronic device comprising:
   a housing;
   a lens barrel mounted to the housing;
   a plurality of lenses mounted in the lens barrel, the plurality of lenses including a first lens with a first diameter and a second lens with a second greater diameter;
   wherein the lens barrel comprises:
     a first end section positioning the first lens, the first end section proximate a first end of the lens barrel;
     a second section positioning the second lens; and
     wherein the first end section includes an inner mating section positioning the first lens and includes an outer thread section, the outer thread section having threads formed thereon, and wherein one or more portions of the inner mating section and associated portions of the outer thread section are separated by a gap; and
   wherein the inner mating section and the outer thread section of first end section are integrally formed with the second section.

6. The device of claim 5, wherein the second section is a second end section proximate a second end of the lens barrel opposite the first end.

7. The device of claim 5, further including a plurality of cavities in a forward surface of the lens barrel, and wherein each of the plurality of cavities forms the gap between one of the one or more portions of the inner mating section and the associated portion of the outer thread section.

8. The device of claim 5, wherein the gap includes a first portion with a first gap size and a second portion with a second gap size.

9. The device of claim 5, wherein the housing comprises a threaded portion sized and configured to receive the outer thread section of the lens barrel.

10. The device of claim 5, wherein the first end section is positioned proximate a light receiving end of the device.

11. The device of claim 5, wherein the second section is positioned proximate a detector.

12. The device of claim 5, wherein the device is configured to implement at least one of zoom, autofocus, and image stabilization.

13. The device of claim 5, wherein the device comprises a miniature camera.

14. The device of claim 5, wherein the device further comprises at least one from the group consisting of a mobile security device, a cell phone, a mobile computing device, and a personal digital assistant.

\* \* \* \* \*